United States Patent [19]
Kobayashi et al.

[11] Patent Number: 6,015,507
[45] Date of Patent: *Jan. 18, 2000

[54] LIQUID CRYSTAL ELEMENT HAVING COMPOSITE LAYER

[75] Inventors: Nobuyuki Kobayashi, Kobe; Kiyofumi Hashimoto; Takuji Hatano, both of Suita, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/555,299

[22] Filed: Nov. 8, 1995

[30] Foreign Application Priority Data

Nov. 8, 1994 [JP] Japan .................................. 6-273623
Apr. 13, 1995 [JP] Japan .................................. 7-088098
Oct. 9, 1995 [JP] Japan .................................. 7-261809

[51] Int. Cl.$^7$ .......................... C09K 19/52; G02F 1/137; G02F 1/1333
[52] U.S. Cl. ................. 252/299.01; 252/299.66; 349/88; 349/175; 349/184; 349/185; 349/186
[58] Field of Search .................... 252/299.01, 299.66; 349/86, 88, 175, 184, 185, 186

[56] References Cited

U.S. PATENT DOCUMENTS

| | | | |
|---|---|---|---|
| 4,493,532 | 1/1985 | Kaneko et al. | 252/299.1 |
| 4,780,241 | 10/1988 | Furukawa et al. | 252/299.63 |
| 5,188,815 | 2/1993 | Coates et al. | 252/299.01 |
| 5,274,484 | 12/1993 | Mochizuki et al. | 359/55 |
| 5,437,811 | 8/1995 | Doane et al. | 252/299.01 |
| 5,731,861 | 3/1998 | Hatano et al. | 349/169 |

OTHER PUBLICATIONS

Cholesteric Liquid Crystal/Polymer Gel Dispersion Bistable at Zero Field, D. K. Yang, et al, IEEE, 1991, pp. 49–52.

Polymer–Stabilized Cholesteric Texture Materials for Black–On–White Displays, J. L. West, et al., SID Digest, 1994, pp. 608–610.

Cholesteric Liquid–Crystal/Polymer–Gel Dispersions: Reflective Display Applications, D. K. Yang, et al., SID Digest, 1992, pp. 759–761.

Primary Examiner—Shean C Wu
Attorney, Agent, or Firm—Sidley & Austin

[57] ABSTRACT

A liquid crystal element includes a pair of plates at least one of which is transparent, and a composite layer retained between the plates and including a liquid crystal material in a transparent resin substrate. In the liquid crystal element, (A) the liquid crystal material in the composite layer contains aromatic rings and exhibits a cholesteric phase, the substrate in the composite layer is made of resin and contains aromatic rings, and a ratio of the number of aromatic rings to that of carbon atoms in the main chain of monomer is in a range from 1:5 to 1:12; (B) the liquid crystal material in the composite layer is formed of a mixture of a liquid crystal material exhibiting a nematic phase and a liquid crystal material exhibiting a smectic phase, and exhibits a cholesteric phase as a whole; or (C) the liquid crystal material in the composite layer is formed of a mixture of a tolane liquid crystal material, a biphenyl liquid crystal material and a chiral ingredient, and exhibits a cholesteric phase as a whole.

27 Claims, 6 Drawing Sheets

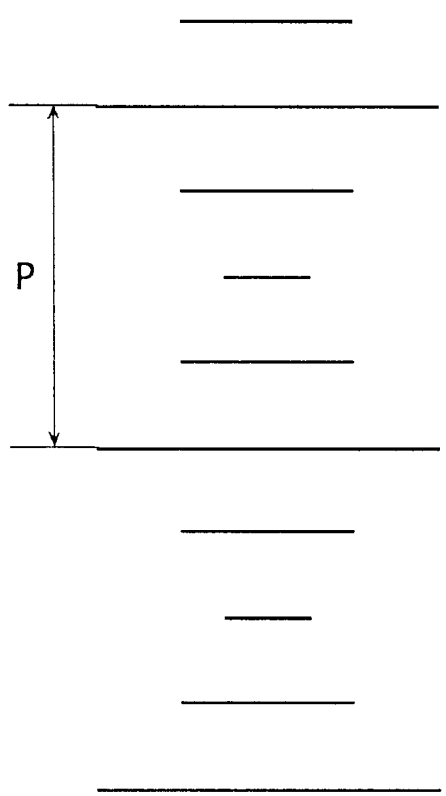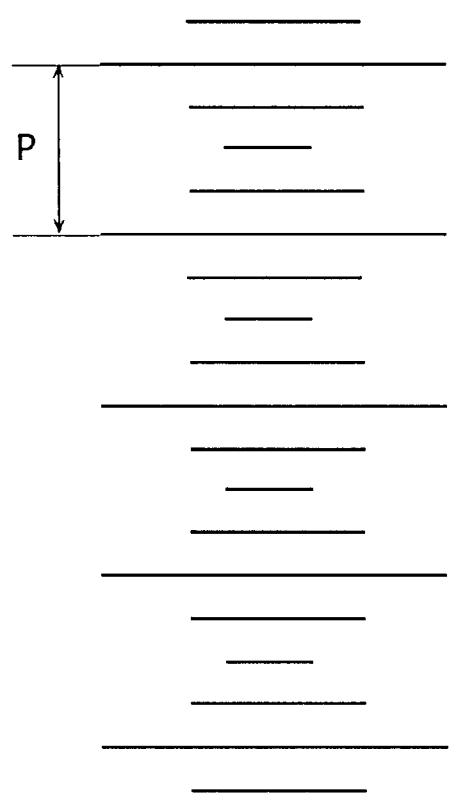

Fig.6(a)
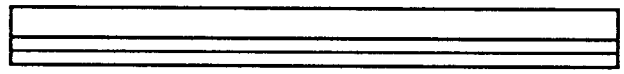
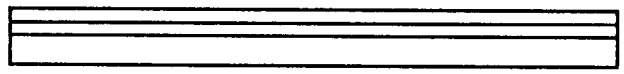
Fig.6(b)
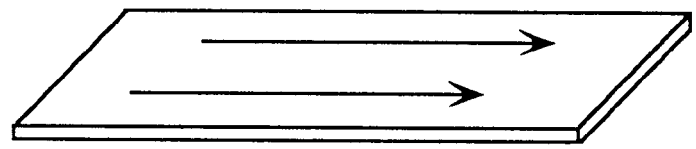
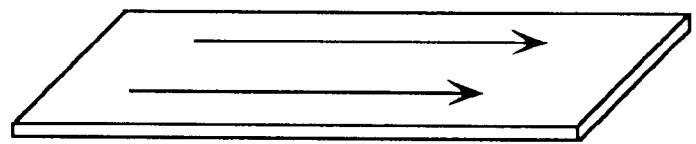
Fig.6(c)
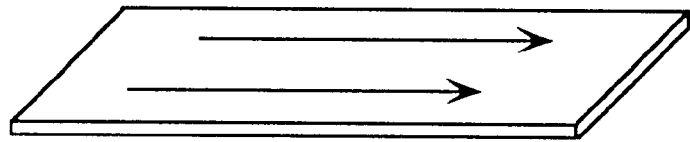
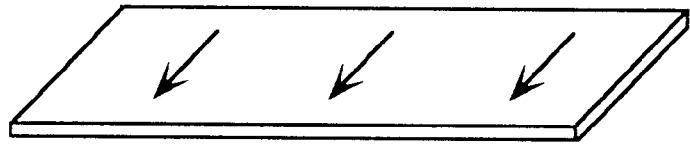

LIQUID CRYSTAL ELEMENT HAVING COMPOSITE LAYER

BACKGROUND OF THE INVENTION

1. Field of the Invention

The present invention relates to a liquid crystal element having a composite layer which includes a liquid crystal material and a transparent substrate formed of, e.g., a resin.

2. Description of the Background Art

The liquid crystal element having a composite layer formed of a liquid crystal material and a transparent substrate formed of, e.g., a resin requires no polarizer or the like. Therefore, it has been expected to be applied to wide and bright liquid crystal display devices. Such liquid crystal elements are classified into the following three types, depending on the form of a composite layer.

Type 1 relates to an element including a pair of plates and a composite layer held between the plates. The composite layer has a large number of microcapsules formed of a resin material such as epoxy resin, and the microcapsules internally confine a liquid crystal material. The composite layer may include another resin in addition to the microcapsules. The liquid crystal element is prepared by mixing a liquid crystal material and a resin material, stirring the mixture at a high speed to form microcapsules, and filling a space between the pair of plates with the microcapsules.

Type 2 relates to an element including a pair of plates and a composite layer held between the plates. In the composite layer, a liquid crystal material and a resin material are phase-separated. As a resin material, for example, a photo-curing resin is used. This type of liquid crystal element is prepared by mixing a liquid crystal material, a photo-curing resin material and a photo-polymerization initiator, filling the resultant mixture into a space between the plates, and then curing the resin material by irradiating, e.g., ultraviolet rays to cause phase separation.

Type 2 can be sub-classified into three classes. The element of the first class includes a composite layer which is referred to as polymer dispersed liquid crystal (PDLC). In the composite layer, the liquid crystal material is dispersed in the form of liquid-cells in the resin material. The second class is included in the above PDLC except for that the liquid crystal is dispersed in the form of honeycomb structure in the resin material. This type of composite layer is prepared by increasing a rate of the liquid crystal material in the composite layer. The element of the third class includes a composite layer which is referred to as polymer network liquid crystal (PNLC). In this type of composite layer, the phase-separated resin material has a network structure called a three-dimensional network.

The element of the third type (type 3) includes a composite layer which is formed by impregnating a substrate having a large number of small pores with a liquid crystal material and is retained between a pair of plates. The substrates may be formed of resin, fibrous glass or the like.

For liquid crystal materials, it is known that a liquid crystal element exhibits a memory effect if it includes a composite layer formed of a liquid crystal material exhibiting cholesteric phase and a small amount of resin material added thereto. Such a liquid crystal element requires no memory elements such as TFT and MIM and has been paid attention to as an element for providing a high-precision display device.

Specifically, in a liquid crystal element including a composite layer, which is retained between two transparent plates and is formed of a liquid crystal material exhibiting a cholesteric phase such as a cholestric liquid crystal material and a chiral nematic liquid crystal material as well as a small amount of resin material added thereto, when a low pulse voltage is applied to the film through transparent conductive films positioned inside the plates, a focal conic state, i.e., a phenomenon that helical axes of liquid crystal molecules are irregularly directed occurs, so that the incident light beams are scattered, resulting in an opaque appearance of the liquid crystal. When a high pulse voltage is applied similarly, the helical axes of liquid crystal molecules are aligned vertically with respect to the plates and thus the planar state is obtained, so that the liquid crystal becomes transparent. These two states are maintained stably even after the voltage application is terminated. It has been considered that the bistability of these two states is achieved owing to the fact that the resin restricts movement of the liquid crystal.

The above liquid crystal element having the composite layer, which is formed of a liquid crystal material exhibiting a cholesteric phase and a transparent substrate such as resin, can also employ the above-described three modes of composite layers.

Regardless of the types of the composite layers, however, the conventional liquid crystal element, which includes the composite layer including the liquid crystal material exhibiting the cholesteric phase and the transparent substrate, cannot achieve a sufficient contrast. Therefore, development of liquid crystal elements showing a high contrast have been demanded.

Further, a liquid crystal material exhibiting a cholesteric phase selectively reflects light beams having a specific wavelength, which corresponds to the product of a helical pitch length and an average refractive index of the liquid crystal, to attain a colored transparent state, when it is in the planar state. Therefore, transparent-to-white display can be achieved by adjusting the wavelength of selective reflection of the liquid crystal to be, for example, in the infrared range. In this case, however, a transmittance of visual rays decreases in the planar state, resulting in a reduced contrast.

SUMMARY OF THE INVENTION

Accordingly, it is an object of the invention to provide a liquid crystal element exhibiting a memory effect and a high contrast.

In order to achieve the above object, the present invention provides the following three types of liquid crystal elements having composite layers.

(1) First liquid crystal element having a composite layer

A liquid crystal element including a pair of plates at least one of which is transparent, and a composite layer retained between the plates and including a liquid crystal material in a transparent resin substrate, wherein a molecule of the liquid crystal material in the composite layer contains an aromatic ring and exhibits a cholesteric phase, the resin substrate in the composite layer contains aromatic rings, and a ratio of the number of aromatic rings to that of carbon atoms in the main chain of monomer is in a range from 1:5 to 1:12, the number of the carbon atoms being the number of carbon atoms of groups in the main chain of monomer of said transparent resin represented by —$CH_2$—, —CH— or the like except for aromatic rings, —CO— groups, and —COOH— groups.

According to the first liquid crystal element having the composite layer of the present invention, both of the liquid crystal material exhibiting a cholesteric phase and the resin substrate contain aromatic rings. Therefore, wettability thereof increases (i.e., the solubility parameters of them have close values) and the mutual intermolecular force increases, so that an excellent memory effect can be achieved.

The reason for the above-specified range of the ratio (1:5 to 1:12) of the number of aromatic rings to that of carbon atoms in the main chain of monomer of the resin substrate is as follows. If the ratio is more than 1:5 and thus the number of aromatic rings is excessively large, the aromatic rings will form a steric hindrance against the liquid crystal material and the interaction between the aromatic ring and the liquid crystal becomes excessively strong, so that the liquid crystal material cannot smoothly move even when a voltage is applied. On the other hand, if the ratio is smaller than 1:12 and thus the number of aromatic rings is excessively small, the interaction between the aromatic ring and the liquid crystal material becomes excessively weak, so that the orientation of liquid crystal returns to the initial state after application of a pulse voltage, deteriorating memory effect. Further, if the number of aromatic rings is excessively small, the rigidity of polymer chain decreases and the thermal momentum increases, resulting in unpreferable reduction of the anchoring strength, i.e., the interaction between liquid crystal material and resin substrate. With a ratio (e.g., 1:4, 1:2, 1:13 or 1:19) out of the above-specified range from 1:5 to 1:12, good bistability cannot be obtained.

In the first liquid crystal element having the composite layer of the invention, the weight ratio of the liquid crystal material to the transparent resin substrate can be in a range from 5:5 to 9:1 and more preferably from 6:4 to 9:1, whereby good bistability and high contrast can be achieved.

The transparent resin substrate may be formed of a photo-curing resin, a thermosetting resin or the like. The photo-curing resin is preferably used for preventing the liquid crystal material from thermal damage during curing. In the structure using the photo-curing resin, initiation of polymerization can be controlled easily, because the polymerization does not start unless ultraviolet rays are irradiated thereto. Further, forms of the resin can be controlled easily by controlling the intensity of ultraviolet rays.

The photo-curing resin may be monofunctional or bifunctional acrylate which has a molecular structure containing one or two aromatic rings in the main chain of monomer.

The liquid crystal material exhibiting a cholesteric phase may be cholesteric liquid crystal, chiral nematic liquid crystal formed of nematic liquid crystal and chiral ingredient added thereto or the like. If the liquid crystal material is formed of chiral nematic liquid crystal, both of the nematic liquid crystal material and the chiral ingredient may contain aromatic rings.

The liquid crystal material exhibiting a cholesteric phase is typically a liquid crystal material exhibiting a cholesteric phase under operation environments (e.g., at a room temperature at which the element is operated).

If the liquid crystal material is formed of chiral nematic liquid crystal, the nematic liquid crystal material may contain at least one fluorine atom in the molecule. This increases a transmittance in the transmission state of the composite layer, and reduces a transmittance in the scattering state of the same, so that a contrast is improved. The reason for this may be as follows. Owing to fluorine atom(s) contained in the nematic liquid crystal molecule, the interaction force, i.e., intermolecular force between the liquid crystal material and the resin substrate attains an appropriate state, so that response to pulse voltage is improved.

Alternatively, the molecule of the chiral ingredient may contain at least one cyano group or at least one —COO— group in addition to aromatic rings.

(2) Second liquid crystal element having a composite layer

A liquid crystal element including a pair of plates at least one of which is transparent, and a composite layer retained between the plates and including a liquid crystal material in a transparent substrate, wherein the liquid crystal material in the composite layer is formed of a mixture of a liquid crystal material exhibiting a nematic phase and a liquid crystal material exhibiting a smectic phase, and exhibits a cholesteric phase as a whole.

According to the second liquid crystal element having the composite layer of the present invention, since the interaction between the liquid crystal molecules in the short-axis direction is increased owing to mixing of the liquid crystal material exhibiting a nematic phase and the liquid crystal material exhibiting a smectic phase, a transmittance increases significantly in the transparent state and remains at the substantially same level in the scattering state, as compared with a material not containing smectic liquid crystal material. As a result, a contrast is significantly improved. Further, a good contrast can be attained even in the case where a selective reflection wavelength is set to a value, for example, in the infrared range for creating a transparent-to-white mode. In addition, since the material exhibits a cholesteric phase as a whole, it can have a memory effect.

Also in the second liquid crystal element, the liquid crystal material exhibiting a nematic phase and the liquid crystal material exhibiting a smectic phase to be mixed as well as the liquid crystal material exhibiting a cholesteric phase as a whole are typically liquid crystal materials each exhibiting the above phases under operation environments (e.g., at a room temperature at which the element is operated).

(3) Third liquid crystal element having a composite layer

A liquid crystal element including a pair of plates at least one of which is transparent, and a composite layer retained between the plates and including a liquid crystal material in a transparent substrate, wherein the liquid crystal material in the composite layer is formed of a mixture of a tolane liquid crystal material, a biphenyl liquid crystal material and a chiral ingredient, and exhibits a cholesteric phase as a whole.

Also in this third element, the liquid crystal material exhibiting a cholesteric phase as a whole is typically a liquid crystal material exhibiting a cholesteric phase under operation environments (e.g., at a room temperature at which the element is operated).

According to the third liquid crystal element having the composite layer of the present invention, since the transmittance in the transparent state increases significantly and the transmittance in the scattering state remains at the substantially same level, a contrast is significantly improved, as compared with the cases of using a chiral ingredient and a tolane liquid crystal and using a chiral ingredient and a biphenyl liquid crystal. Further, a good contrast can be attained even in the case of setting a selective reflection wavelength to a value, for example, in the infrared region for creating a transparent-to-white mode. The reason for this may be as follows. Owing to use of the tolane liquid crystal and the biphenyl liquid crystal, the response of liquid crystal molecules to an applied voltage is improved, and the interaction between the liquid crystal and the substrate is improved. Further, in the structure where a resin substrate is used as the transparent substrate, the phase transition temperature at the process of mixing liquid crystal and resin monomer can be low. In addition, since the material exhibits a cholesteric phase as a whole, a memory effect can be obtained.

In the third liquid crystal element having the composite layer of the present invention, the "tolane liquid crystal material" means a material in which at least one portion is formed of a tolane compound. The "biphenyl liquid crystal material" means a liquid crystal material in which at least one portion is formed of a compound having two benzene rings coupled together without interposing a central functional group therebetween, such as alkyl-cyanobiphenyl, alkoxy-cyanobiphenyl, and biphenyl cyclohexane. The compound may be a combination of two or more of the above compounds.

In the second and third liquid crystal elements having the composite layers of the present invention, the transparent substrate may be formed of resin. A photo-curing resin may be preferably used for preventing the liquid crystal material from thermal damage during curing. In the structure using the photo-curing resin, initiation of polymerization can be controlled easily, because the polymerization does not start unless ultraviolet rays are irradiated thereto. Further, forms of the resin can be controlled easily by controlling the intensity of ultraviolet rays.

The composite layer used in the first, second, and third liquid crystal elements having the composite layers of the present invention may be any of the above-described types, i.e., type 1 containing microcapsules, type 2 obtained by phase separation, and type 3 obtained by impregnating a substrate having a large number of pores with a liquid crystal material. In view of good memory effect and easy control of curing of the resin, it is preferable to use the composite layer of the sub-type in the type 2, which is obtained by phase separation caused by irradiating, e.g., ultraviolet rays to the mixture of the photo-curing resin material and the liquid crystal material.

For similar reasons to those as described aleady and in view of improvement of a contrast, the transparent substrate of the composite layer used in the first, second, and third liquid crystal elements having the composite layers of the present invention may have a three-dimensionally continuous mesh structure.

In the first, second, and third liquid crystal elements having the composite layers of the present invention, the "plate" holding or retaining the composite layer may conceptionally be a deflectable or nondeflectable plate-like member or a flexible film or the like. For example, one of the paired plates may be a plate having a rigidity enough to hold the composite layer, and the other may be a member, e.g., a film protecting the composite layer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5(a) and 5(b) show a helical pitch length of a liquid crystal exhibiting a cholesteric phase;

FIGS. 6(a), 6(b) and 6(c) show a rubbing direction in an orientation film on a plate of a liquid crystal element.

DESCRIPTION OF THE PREFERRED EMBODIMENTS

Embodiments of the invention will now be described below with reference to the drawings.

Figure 1:
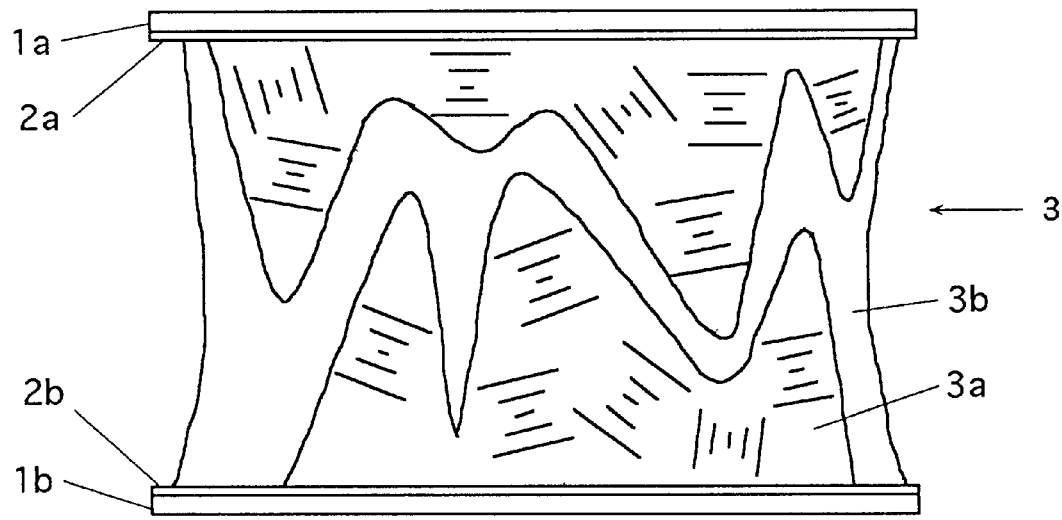
FIG. 1 shows an example of a liquid crystal element of a transmission type having a composite layer according to the invention.

FIG. 1 shows an example of a liquid crystal element having a composite layer of a trasmission type according to the invention. The liquid crystal element includes a pair of transparent plates 1a and 1b opposed to each other, and a composite layer 3 held between the plates 1a and 1b. Transparent conductive films 2a and 2b are formed on inner surfaces of the plates 1a and 1b, respectively. The composite layer 3 is formed in such a manner that a liquid crystal material 3a exhibiting a cholesteric phase at a room temperature and a photo-curing resin 3b is loaded into a space between the transparent conductive layers 2a and 2b, and light beams are irradiated thereto to photo-polymerize the photo-curing resin 3b and cause phase separation between the liquid crystal material 3a and the resin 3b. The liquid crystal element is a simple matrix driven device without memory elements such as TFT and MIM.

The liquid crystal material 3a exhibits a cholesteric phase at a room temperature at which the element is used, and is specifically a cholesteric liquid crystal, a chiral nematic liquid crystal prepared by adding a chiral ingredient to a nematic liquid crystal, a liquid crystal prepared by adding a smectic liquid crystal to a nematic liquid crystal, or a liquid crystal formed of a tolane liquid crystal, a biphenyl liquid crystal and a chiral ingredient. The photo-curing resin 3b is prepared by mixing a resin material including polymerizable monomers or oligomers as well as a photo-polymerization initiator compatible to the resin material.

Figure 2:
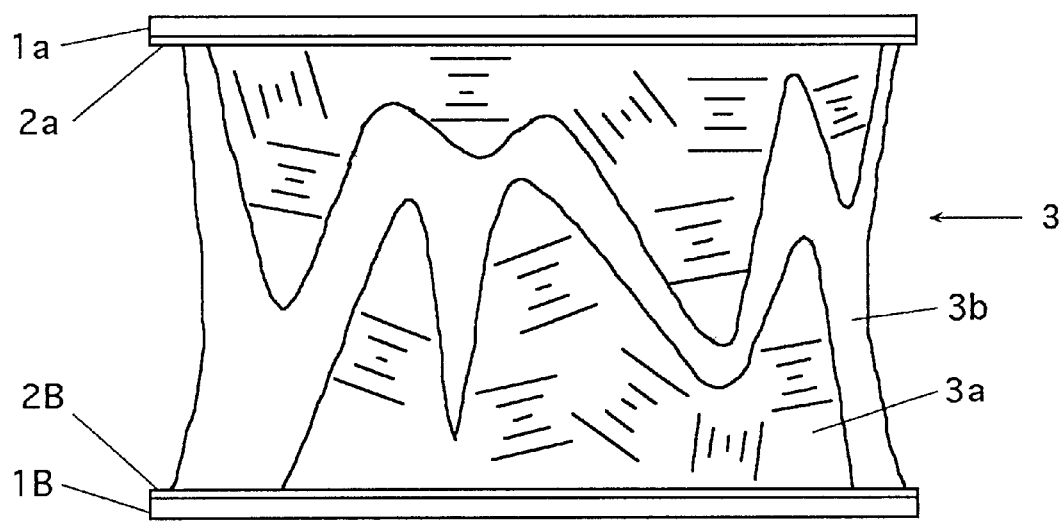
FIG. 2 shows an example of a liquid crystal element of a reflection type having a composite layer according to the invention.

FIG. 2 shows an example of a liquid crystal element having a composite layer of a reflection type according to the invention. This liquid crystal element includes an opaque plate 1B and an opaque conductive film 2B instead of the transparent plate 1b and the transparent conductive film 2b in the element shown in FIG. 1, respectively. The other structures are the same as those of the element shown in FIG. 1, and the same parts and portions bear the same reference numbers as those in FIG. 1.

Figure 3A:
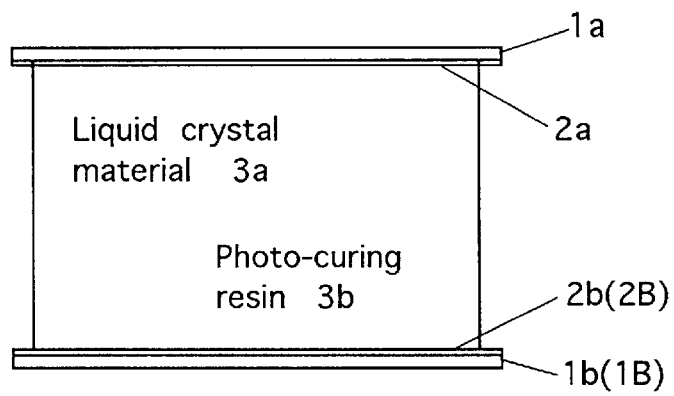
FIG. 3(a), FIG. 3(b), and FIG. 3(c) show an example of a process of manufacturing a liquid crystal element having a composite layer according to the invention.

These liquid crystal elements are manufactured as follows. As shown in FIG. 3(a), the pair of plates 1a and 1b or plates 1a and 1B, which are covered with the conductive films 2a and 2b or films 2a and 2B, respectively, are assembled with a spacer (not shown) therebetween such that the conductive films 2a and 2b or films 2a and 2B are positioned to oppose each other. Then, a space between the pair of plates is filled with the liquid crystal material, photo-curing resin material and photo-polymerization initiator, which are mixed at a predetermined ratio.

Figure 3B:
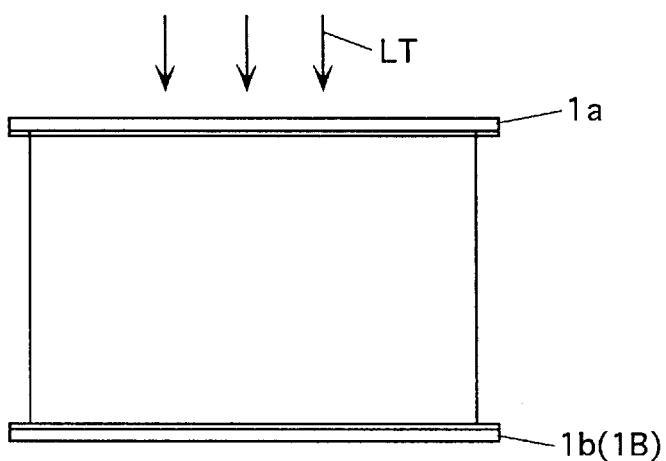
Figure 3C:
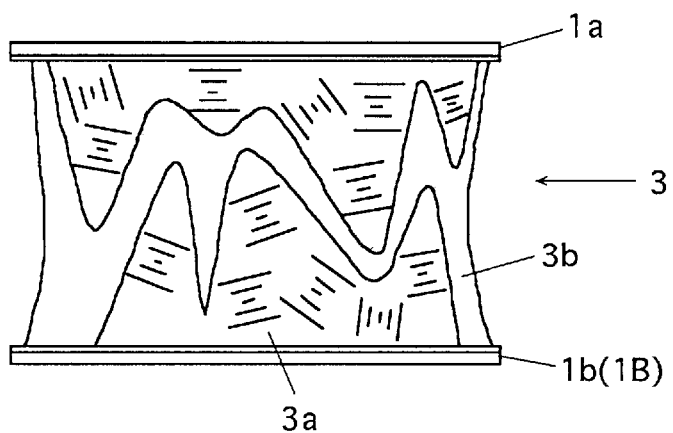

Light beams LT such as ultraviolet light beams, which are selected depending on the resin type, are irradiated with a predetermined illuminance to cure the resin material, as shown in FIG. 3(b). As a result, only the resin material 3b is cured to cause phase separation and the helical axes of the cholesteric liquid crystal material 3a are irregularly oriented, as shown in FIG. 3(c), so that the liquid crystal material 3a scatters visual rays to exhibit an opaque appearance. Normally, it exhibits a white opaque appearance.

In order to drive these liquid crystal elements, two kinds of pulse voltages, i.e., high and low pulse voltages, are applied thereto.

Figure 4A:
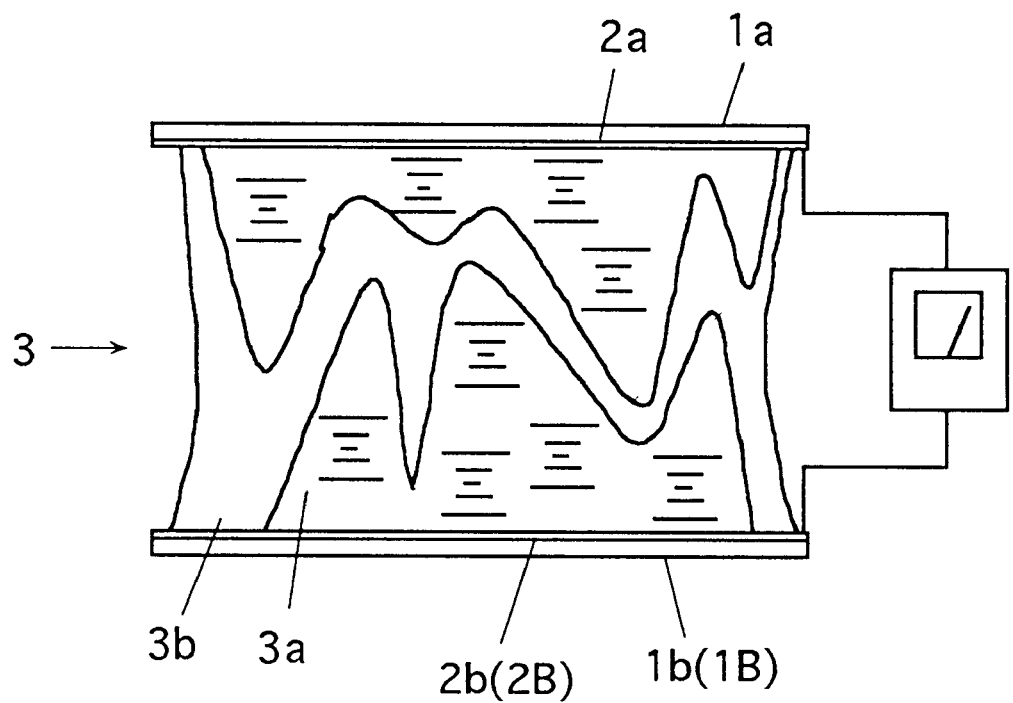
FIG. 4(a) and FIG. 4(b) show an example of state variation caused by voltage application in a liquid crystal element having a composite layer according to the invention.

In such a structure that the liquid crystal material is a cholesteric liquid crystal, a chiral nematic liquid crystal, or a mixture of a nematic liquid crystal and a smectic liquid crystal, a voltage of, e.g., about 80 V in the form of 10 msec (milli-seconds) pulse is applied to the composite layer 3 via the conductive films 2a and 2b or films 2a and 2B, as shown in FIG. 4(a), whereby the helical axes in the liquid crystal 3a, which are irregularly directed or oriented in the initial state, are oriented vertically with respect to the plates 1a and 1b or plates 1a and 1B to form the planar texture. If the selective reflection wavelength is in the infrared or ultraviolet range, the element transmits the light in the visual range, depending on a predetermined helical pitch length, to exhibit a transparent appearance. If the selective reflection wavelength is in the visual range, the element exhibits a colored appearance corresponding to the reflected radiation.

Figure 4B:
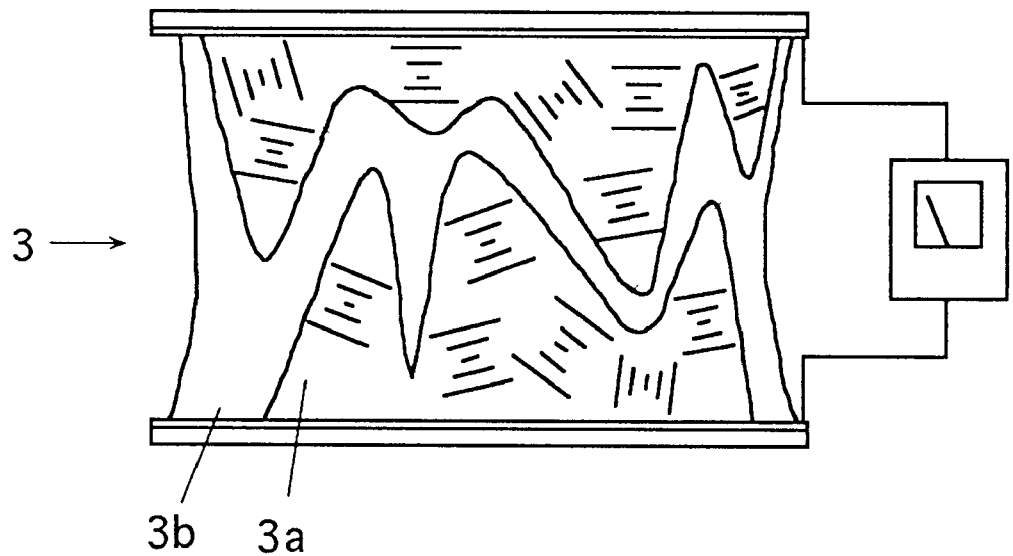

As shown in FIG. 4(b), when a pulse voltage of about 40 V and 10 msec is applied to the composite layer 3 in the above state, the uniform orientation of helical axes is lost, and the helical axes are oriented irregularly to form the focal conic texture, so that incident rays are scattered to exhibit an opaque appearance. These two states are maintained even after the pulse voltage supply is terminated, and thus bistability is achieved.

In such a structure that the liquid crystal material is formed of a mixture of a tolane liquid crystal, a biphenyl liquid crystal material and a chiral ingredient, the liquid crystal material is set to the planar or focal conic state by applying predetermined high or low pulse voltages. In the planar state, if the wavelength of selective reflection is in the visual range, depending on a predetermined helical pitch length, it exhibits a colored appearance corresponding to the reflected radiation. If the selective reflection wavelength is in the infrared or ultraviolet ranges, the element exhibits a transparent appearance. Since this embodiment is aimed at the transparent-to-white mode, the selective reflection wavelength of the liquid crystal material is set in the infrared range. Since a selective reflection wavelength closer to the visual range gives a greater transmittance, an ideal wavelength is near 800 nm. However, the actual wavelength of selective reflection shifts toward a shorter wavelength side to a certain extent after resin curing in the process of producing the liquid crystal element. Therefore, the wavelength of selective reflection is set in a longer wavelength range. The element attains the planar state when the pulse voltage of, e.g., about 180 V and 10 msec is applied, and attains the focal conic state when the pulse voltage of about 80 V and 10 msec is applied.

Bistability (memory effect) of the planar and focal conic states can be exhibited easily in such cases that both of the liquid crystal and the resin material contain aromatic rings, and that the liquid crystal material is a chiral nematic liquid crystal and both of the nematic liquid crystal and the chiral ingredient contain aromatic rings.

Further, good bistability is attained by using monofunctional or bifunctional acrylate wherein the ratio of the number of aromatic rings to that of carbon atoms in the main chain of monomer is in a range from 1:5 to 1:12. The number of carbon atoms denotes the number of carbon atoms of groups represented by —CH$_2$—, —CH— or the like except for aromatic rings, —CO— and —COOH— groups in the main chain of monomer of the resin material.

Also, if the mixing ratio of the liquid crystal 3a to the photo-curing resin 3b is in a range from 5:5 to 9:1, transmission characteristics such as good bistability and high contrast are obtained.

Also, if the molecule of the liquid crystal material contains at least one fluorine atom, the contrast is improved.

In such a structure that the liquid crystal material exhibiting a cholesteric phase at the room temperature at which the element is used is formed of a mixture of a liquid crystal material exhibiting a nematic phase at the room temperature and a liquid crystal material exhibiting a smectic phase at the room temperature, or of a mixture of tolane, biphenyl liquid crystal materials and a chiral ingredient added thereto, a good contrast is obtained between the transparent state and the scattering state.

FIG. 5 shows a helical structure of liquid crystal molecules in a chiral nematic liquid crystal. The helical structure has helically twisted layers of the molecules. A distance P corresponding to a distance between two layers of molecules which are directed in the same direction is referred to as a helical pitch length. If the mixed chiral ingredient is small in quantity, the liquid crystal molecules are not twisted to a large extent, so that the helical pitch length P and thus the reflection wavelength increase, as shown in FIG. 5(a). If the mixed chiral ingredient is large in quantity, the helical pitch length P and thus the reflection wavelength decrease as shown in FIG. 5(b).

As shown in FIG. 6(a), in such a structure that each conductive plate is equipped with an orientation film (film controlled by surface treatment), a significantly high contrast ratio is obtained, as compared with a liquid crystal element without an orientation film. Particularly, in such a structure that the rubbing directions of the two orientation films are crossed at 90° as shown in FIG. 6(c), the contrast ratio can be further increased and the voltage required for driving the liquid crystal can be reduced, as compared with the cases that the rubbing directions are the same as each other, i.e., at 0° as shown in FIG. 6(b). Surface treatment may be performed, e.g., by effecting ion-beam irradiation on the plate itself instead of provision of the orientation film.

Specific embodiments of the invention will be described below.

In embodiments 1–11 and comparative examples 1 to 5, liquid crystal elements of a transmission type shown in FIG. 1 were manufactured. Transmittance was determined by using a stabilized He—Ne laser as a light source, receiving the rays transmitted through and scattered by the liquid crystal element on a photodiode and detecting the intensity of the rays.

The nematic liquid crystal MN1000XX manufactured by Chisso Co. mentioned in the following description is mainly made of a tolane compound containing aromatic rings and fluorine atoms, and has the following properties:

$\Delta n: 0.219 (\lambda=589 \text{ nm}); T_{N-1}=69.9° \text{ C.}; V_{90}=2.29 \text{ V}; \eta_{20}=30.6 \text{ cps}$ The constitutions of the embodiments 1 to 7 and the composition of each material used therein are shown in Tables 1 and 2. In the table 1, "Ex" denotes the embodiment, and "Ratio 1" denotes the ratio of the number of aromatic rings to that of carbon atoms in the main chain of monomer constituting a resin material, wherein the number of carbon atoms denotes the number of carbon atoms of groups represented by —CH$_2$—, —CH— or the like except for aromatic rings, —CO—, —COOH groups or the like in the main chain of monomer. "Ratio 2" denotes the ratio by weight of a liquid crystal material to a resin material. The value in parentheses under the item "Ratio 1" is an actual ratio of the number of aromatic rings to that of carbon atoms existing in the main chain of monomer. "O" in Table 2 denotes the presence of a specified component in the material, and "X" denotes the absence of the specified component in the material.

TABLE 1

| Ex | LC/Mtr | RS/Mtr | Ratio 1 | Ratio 2 | Rb | Tm/H | Tm/L |
|----|--------|--------|---------|---------|-----|------|------|
| 1 | E31LV CM33 C15 | DAROCUR R712 | 1:6.5 (2:13) | 8:2 | No | 64% | 31% |
| 2 | E31LV CM33 C15 | DAROCUR R128H | 1:5 (1:5) | 8:2 | No | 60% | 10% |
| 3 | MN1000XX S-811 | DAROCUR R128H | 1:5 (1:5) | 8:2 | No | 68% | 8% |
| 4 | MN1000XX S-811 | DAROCUR R712 | 1:6.5 (2:13) | 8:2 | No | 64% | 50% |
| 5 | MN1000XX CB15 | DAROCUR R712 | 1:6.5 (2:13) | 8:2 | No | 50% | 18% |

TABLE 1-continued

| Ex | LC/Mtr | RS/Mtr | Ratio 1 | Ratio 2 | Rb | Tm/H | Tm/L |
|---|---|---|---|---|---|---|---|
| 6 | MN1000XX CM33 C15 | DAROCUR R128H | 1:5 (1:5) | 8:2 | 0° | 54% | 2% |
| 7 | MN1000XX CM33 C15 | DAROCUR R128H | 1:5 (1:5) | 8:2 | 90° | 70% | 1% |

LC/Mtr: liquid crystal material
RS/Mtr: resin material
Rb: rubbing
Tm/H: transmittance at high voltage
Tm/L: transmittance at low voltage

TABLE 2

| Name | | Aromatic Ring | F | COO | Cyano |
|---|---|---|---|---|---|
| E31LV | Nematic LC (Merck) | O | X | — | — |
| MN1000XX | Nematic LC (Chisso) | O | O | — | — |
| S-1184 | Nematic LC (Merck) | X | X | — | — |
| CM33 | Chiral Dopant (Chisso) | O | — | O | X |
| C15 | Chiral Dopant (Chisso) | O | — | X | O |
| S-811 | Chiral Dopant (Merck) | O | — | O | X |
| CB15 | Chiral Dopant (Merck) | O | — | X | O |
| DAROCUR | PP/Int 1173 (Ciba-Geigy) | O | — | — | — |
| R712 | B/Acr (Nippon Kayaku) | O | — | — | — |
| R128H | M/Acr (Nippon Kayaku) | O | — | — | — |
| R526 | B/Acr (Nippon Kayaku) | X | — | — | — |
| MPL204 | M/Acr (Nippon Kayaku) | X | — | — | — |
| AMP10G | M/Acr (Shin-nakamura) | O | — | — | — |

LC: liquid crystal
PP/Int: photo-polymerization initiator
B/Acr: bifunctional acrylate
M/Acr: monofunctional acrylate Embodiment 1

A chiral dopant CM33 (manufactured by Chisso Co., e.g., 42.5 wt. %) containing aromatic rings and —COO— groups, and a chiral dopant C15 (Chisso Co., e.g., 4.7 wt. %) containing aromatic rings and cyano groups were mixed with a nematic liquid crystal E31LV (Merck Co.) containing aromatic rings, so that a predetermined helical pitch length of, e.g., 0.55 μm was accomplished for the purpose of exhibiting a cholesteric phase at a room temperature. The liquid crystal material thus prepared was mixed at a ratio of 8:2 with an aromatic-ring containing bifunctional acrylate R712 (Nippon Kayaku Co.) containing a photo-polymerization initiator DAROCUR 1173 (Ciba-Geigy Co.) at 3 wt. % added thereto. The bifunctional acrylate containing the photo-polymerization initiator constituted a photo-curing resin material.

The mixture of the liquid crystal material and the resin material was held or sandwiched to have a thickness of about 10 μm between two transparent plates having electrode layers. Ultraviolet rays were irradiated at 0.02 mw/cm² for one hour, and then ultraviolet rays were irradiated at 0.25 mw/cm² for one hour, whereby phase separation was caused, and a white opaque liquid crystal element was obtained.

When a pulse voltage of 60 V and 10 msec length was applied to the liquid crystal element, the element exhibited a green appearance and a transmittance of 64%. This state was maintained after one application of the pulse voltage. When a pulse voltage of 40 V and 10 msec length was applied to the liquid crystal element in this state, the element exhibited an opaque appearance and a transmittance of 31%. The scattering state was maintained after one application of the pulse voltage.

From the above results, the following can be understood. In such a structure that each of the liquid crystal, chiral dopant and resin contains aromatic rings, and particularly, the ratio of the number of aromatic rings to that of carbon atoms in the main chain of monomer is 1:6.5 in the resin material, it is possible to obtain a liquid crystal element having a composite layer, which has bistability, high transmittance, and good contrast of 2.1 between the transmission state and the scattering state (i.e., a transmittance ratio of 2.1 between the transmission state and the scattering state).

Embodiment 2

The same liquid crystal material as that in the embodiment 1 was used. A monofunctional acrylate R128H (Nippon Kayaku Co.) having aromatic rings and containing a photo-polymerization initiator DAROCUR 1173 (Ciba-Geigy Co.) at 3 wt. % added thereto, was used as a photo-curing resin material. The liquid crystal and resin materials were mixed at a mixing ratio of 8:2 as was done in the embodiment 1. A liquid crystal element was prepared from the mixture of the liquid crystal and resin materials in the same manner as the embodiment 1.

When a pulse voltage of 80 V and 10 msec was applied to the liquid crystal element, the element exhibited a green appearance and a transmittance of 60%. This state was maintained even after one application of the pulse voltage. When a pulse voltage of 40 V and 10 ms was applied to the liquid crystal element in this state, the element exhibited a transmittance of 10% and a white opaque appearance. This scattering state was maintained even after one application of the pulse voltage.

From the above results, the following can be understood. In such a structure that each of the liquid crystal, chiral dopant and resin contains aromatic rings, and particularly, the ratio of the number of aromatic rings to that of carbon atoms in the main chain of monomer is 1:5 in the resin material, it is possible to obtain a liquid crystal element having a composite layer, which has bistability, high transmittance, and good contrast of 6.0 between the transmission state and the scattering state.

Embodiment 3

A nematic liquid crystal MN1000XX (Chisso Co.) containing fluorine atoms and aromatic rings was mixed with a chiral dopant S-811 (Merck Co., e.g., 30.6 wt. %) containing aromatic rings and —COO— groups, so that a predetermined helical pitch length of, e.g., 0.55 μm was accomplished and the resultant liquid crystal exhibited a cholesteric phase at a room temperature. The liquid crystal material thus prepared was mixed at a ratio of 8:2 with a monofunctional acrylate R128H (Nippon Kayaku Co.) containing photo-polymerization initiator DAROCUR 1173 (Ciba-Geigy Co.) at 3 wt. % added thereto. The monofunctional acrylate containing the photo-polymerization initiator constituted a photo-curing resin material. A liquid crystal element was prepared from the mixture of the liquid crystal material and the resin material in the same manner as the embodiment 1.

When a pulse voltage of 160 V and 10 msec was applied to the liquid crystal element, the element exhibited a green appearance and a transmittance of 68%. This state was maintained even after one application of the pulse voltage. When a pulse voltage of 80 V and 10 msec was applied to the liquid crystal element in this state, the element exhibited a transmittance of 8% and a white opaque appearance. This scattering state was maintained even after one application of the pulse voltage.

From the above results, the following can be understood. In such a structure that each of the liquid crystal, chiral dopant and resin contains aromatic rings, and particularly, the ratio of the number of aromatic rings to that of carbon atoms in the main chain of monomer is 1:5 in the resin material, and the liquid crystal contains fluorine atoms, it is possible to obtain a liquid crystal element having a composite layer, which has bistability, transmittance higher than that in the embodiments 1 and 2 owing to fluorine atoms, and contrast of 8.5 between transmission state and scattering state.

Embodiment 4

The same liquid crystal material as that in the embodiment 3 was used. A photo-curing resin material was formed of a bifunctional acrylate R712 (Nippon Kayaku Co.) containing photo-polymerization initiator DAROCUR 1173 (Ciba-Geigy Co.) at 3 wt. % added thereto. The liquid crystal and resin materials were mixed at a mixing ratio of 8:2. A liquid crystal element was prepared from the mixture of the liquid crystal and resin materials in the same manner as the embodiment 1.

When a pulse voltage of 120 V and 10 msec was applied to the liquid crystal element, the element exhibited a green appearance and a transmittance of 64%. This state was maintained thereafter. When a pulse voltage of 80 V and 10 msec was applied to the liquid crystal element in this state, the element exhibited a transmittance of 50% and a white opaque appearance. This scattering state was maintained thereafter.

From the above results, the following can be understood. In such a structure that each of the liquid crystal, chiral dopant and resin contains aromatic rings, and particularly, the ratio of the number of aromatic rings to that of carbon atoms in the main chain of monomer is 1:6.5 in the resin material, it is possible to obtain a liquid crystal element having a composite layer, which has bistability, high transmittance, and contrast of 1.3 between the transmission state and the scattering state.

Embodiment 5

The same conditions and manners as those in the embodiment 4 were employed except for that a chiral dopant S-811 (Merck Co., e.g., 30.6 wt. %) was replaced with a chiral dopant CB15 (Merck Co., e.g., 29.8 wt. %) containing aromatic rings and cyano groups. Other conditions and manners including a manner of producing a liquid crystal element were the same as those in the embodiment 4.

When a pulse voltage of 80 V and 10 msec was applied to the liquid crystal element, the element exhibited a green appearance and a transmittance of 50%. This state was maintained thereafter. When a pulse voltage of 50 V and 10 msec was applied to the liquid crystal element in this state, the element exhibited a transmittance of 18% and a white opaque appearance. This scattering state was maintained thereafter.

From the above results, the following can be understood. In such a structure that each of the liquid crystal, chiral dopant and resin contains aromatic rings, and particularly, the ratio of the number of aromatic rings to that of carbon atoms in the main chain of monomer is 1:6.5 in the resin material, it is possible to obtain a liquid crystal element having a composite layer, which has bistability, and contrast of 2.8 between transmission state and scattering state, which is higher than that in the embodiment 4, although transmittance at the time of high voltage application is slightly reduced as compared with the embodiment 4.

Embodiment 6

The liquid crystal material and photo-polymerizable resin material used in this embodiment are the same as those in the embodiment 2. The embodiment 6 differs from the embodiment 2 in that, in the process of preparing a liquid crystal element formed of these materials, the embodiment 6 used electrode layers having orientation films which were rubbed and oriented in the same direction. The other conditions such as irradiation of ultraviolet rays were the same as those in the embodiment 2.

When a pulse voltage of 140 V and 10 msec was applied to the liquid crystal element, the element exhibited a green appearance and a transmittance of 54%. This state was maintained thereafter. When a pulse voltage of 80 V and 10 msec was applied to the liquid crystal element in this state, the element exhibited a transmittance of 2% and a white opaque appearance. This scattering state was maintained thereafter.

From the above results, the following can be understood. By using rubbed orientation films on the electrode layers, it is possible to produce a liquid crystal element having a composite layer, which has remarkably high contrast of 27 between transmission and scattering states, compared with the that of the embodiment 2, although transmittance at the time of application of a high voltage is slightly reduced.

Embodiment 7

The same conditions as those in the embodiment 6 were employed except for that two orientation films on electrode layers were rubbed so that the orientation directions thereof were crossed at 90°.

When a pulse voltage of 100 V and 10 msec was applied to the liquid crystal element, the element exhibited a green appearance and a transmittance of 70%. This state was maintained thereafter. When a pulse voltage of 70 V and 10 msec was applied to the liquid crystal element in this state, the element exhibited a transmittance of 1% and a white opaque appearance. This scattering state was maintained thereafter.

From the above results, the following can be understood. In such a structure that the two orientation films are rubbed such that the rubbing directions thereof are crossed at 90°, it is possible to produce a liquid crystal element having a composite layer, which has remarkably high contrast of 70, and for which the driving voltage can be reduced, as compared with the embodiment 6 in which the rubbing directions of two orientation films are aligned at 0°.

With respect to the embodiment 3, variation in transmittance in accordance with variation in ratio (shown at "Ratio 2" in Table 1) of liquid crystal material to resin material other than 8:2 is shown in Table 3. All the curing conditions were unchanged.

TABLE 3

| Ratio | Transmittance at High Vol. | High Vol. | Transmittance at Low Vol. | Low Vol. |
|---|---|---|---|---|
| 9:1 | 60.0% | 120V | 3.0% | 60V |
| 7:3 | 62.6% | 130V | 23.1% | 80V |
| 6:4 | 68.4% | 130V | 44.1% | 90V |
| 5:5 | 64.0% | 130V | 50.0% | 90V |

As can be seen from Table 3, the difference between the transmittance during high voltage application and that during low voltage application decreased, and contrast also decreased as the ratio of liquid crystal material to resin material varied from 9:1 to 5:5. When the quantity of resin material increased above the ratio of 5:5, the polymer network structure became finer, no change occurred in transmittance, and memory effect of the liquid crystal element was impaired. The same tendency was also seen not only in the embodiment 3 but also in the other embodiments.

As described in connection with the embodiments 1 to 7, particularly good bistability is obtained in such a structure that the ratio between the number of aromatic rings and that of carbon atoms in the main chain of monomer in the photo-curing resin is in the range from about 1:5 to about 1:7.

As a liquid crystal material exhibiting a cholesteric phase, a cholesteric liquid crystal itself may be used, although nematic liquid crystals mixed with chiral ingredients are used in the embodiments 1 to 7.

In the embodiments 1 to 7, the helical pitch length is about 0.55 $\mu$m and the distance between the two plates holding the mixture of the liquid crystal and the resin material is about 10 μm. However, in such a structure that the reflection wavelength is set in the infrared region in order to obtain a colorless transparent state during the transmission state, the helical pitch length must be increased, for example, to 1.1 μm, and the distance between the two plates must be set to about 20 μm for increasing a degree of scattering. In this case, it is difficult to accomplish sufficient contrast with only the above-described materials (see the comparative example 5 to be described later).

Embodiments 8 to 11 will now be described below. These embodiments use a mixture of a predetermined amount of liquid crystal exhibiting a smectic phase at a room temperature and a liquid crystal exhibiting a nematic phase at a room temperature so that high contrast can be obtained even if the helical pitch length and the distance between the two plates are long.

Tables 4 and 5 show specific factors and results obtained from the mixtures of the nematic liquid crystal and the smectic liquid crystal. Items in Tables 4 and 5 are the same as those in Tables 1 and 2.

Ultraviolet rays were irradiated at 15 mw/cm² for 10 minutes, so that phase separation occurred and a white opaque liquid crystal element was obtained.

When a pulse voltage of 130 V and 10 msec was applied to the liquid crystal element, the element exhibited a transparent appearance and a transmittance of 53.8%. This state was maintained thereafter. When a pulse voltage of 70 V and 10 msec was applied to the liquid crystal element in this state, the element exhibited a transmittance of 3.8% and a white opaque appearance.

From the above results, the following can be understood. By mixing a liquid crystal exhibiting a smectic A-phase, it is possible to produce a liquid crystal element having a composite layer which is transparent in the transmission state and has contrast of 14.2 between transmission state and scattering state. As can be seen from comparison with the comparative example 5, in which an element does not contain a smectic liquid crystal as will be described hereinafter, the liquid crystal element of this embodiment has a significantly improved contrast.

TABLE 4

| Ex | LC/Mtr | RS/Mtr | Rt 1 | Rt 2 | Rb | Tm/H | Tm/L | Qnt |
|----|--------|--------|------|------|-----|------|------|-----|
| 8 | MN1000XX S1 S-811 | DAROCUR R128H | 1:5 (1:5) | 9:1 | No | 53.8% | 3.8% | 15 wt % |
| 9 | MN1000XX S2 S-811 | DAROCUR R128H | 1:5 (1:5) | 9:1 | No | 52.1% | 2.1% | 30 wt % |
| 10 | MN1000XX CS1016 S-811 | DAROCUR R128H | 1:5 (1:5) | 9:1 | No | 53.0% | 4% | 20 wt % |
| 11 | MN1000XX ZL13654 S-811 | DAROCUR R128H | 1:5 (1:5) | 9:1 | No | 43.1% | 2% | 20 wt % |

LC/Mtr: liquid crystal material
RS/Mtr: resin material
Rb: rubbing
Rt: Ratio
Tm/H: transmittance at high voltage
Tm/L: transmittance at low voltage
Qnt: quantity of smectic liquid crystal

TABLE 5

| Name | | Aromatic Ring | F | COO | Cyano |
|------|--|---------------|---|-----|-------|
| S1 | Smectic (A) LC (Merck) | O | — | — | — |
| S2 | Smectic LC (Merck) | O | X | X | O |
| CS1016 | Chiral Smectic (C) LC (Merck) | — | — | — | — |
| ZLI3654 | Chiral Smectic (C) LC (Merck) | — | — | — | — |

LC: liquid crystal

Embodiment 8

A nematic liquid crystal MN1000XX (Chisso Co.) exhibiting a nematic phase at a room temperature and a liquid crystal S1 (Merck Co.) exhibiting a smectic phase at a room temperature added at 15 wt. % thereto were mixed with chiral dopant S-811 (Merck Co.) of, e.g., 19.8 wt. % so that a predetermined helical pitch length of, e.g., 1.1 μm was obtained. The liquid crystal material thus prepared and a monofunctional acrylate R128H containing photo-polymerization initiator DAROCUR 1173 (Ciba-Geigy Co.) at 10 wt. % added thereto were mixed at a ratio of 9:1.

The mixture of the liquid crystal material and the resin material was held to have a thickness of about 20 μm between two transparent plates having electrode layers.

Embodiment 9

The same conditions (including the conditions for producing the liquid crystal element) as those in the embodiment 8 were employed except for that the liquid crystal S1 (Merck Co.) was replaced with a liquid crystal S2 (Merck Co.) at 30 wt. % exhibiting a smectic phase at a room temperature in the liquid crystal material.

When a pulse voltage of 140 V and 10 msec was applied to the liquid crystal element, the element exhibited a transparent appearance and a transmittance of 52.1%. This state was maintained thereafter. When a pulse voltage of 70 V and 10 msec was applied to the liquid crystal element in this state, the element exhibited a transmittance of 2.1% and a white opaque appearance. Thus, contrast of 24.8, which is higher than that in the embodiment 8, was obtained between the transmission state and the scattering state.

Embodiment 10

The same conditions (including the conditions for producing the liquid crystal element) as those in the embodiment 8 were employed except for that the liquid crystal S1 (Merck Co.) was replaced with a liquid crystal CS1016 (Chisso Co.) at 20 wt. % exhibiting a chiral smectic C phase at a room temperature in the liquid crystal material.

When a pulse voltage of 180 V and 10 msec was applied to the liquid crystal element, the element exhibited a transparent appearance and a transmittance of 53.0%. This state was maintained thereafter. When a pulse voltage of 90 V and 10 msec was applied to the liquid crystal element in this state, the element exhibited a transmittance of 4.0% and a white opaque appearance. Thus, contrast of 13.3 between the transmission state and the scattering state was obtained. In this embodiment, a further higher contrast was obtained owing to mixing of a smectic liquid crystal, compared with that in the comparative example 5 to be described hereinafter.

Embodiment 11

The same conditions as those in the embodiment 8 were employed except for that a liquid crystal S1 (Merck Co.) at 15 wt. % was replaced with a liquid crystal ZLI3654 (Merck Co.) at 20 wt. % exhibiting a chiral smectic C phase at a room temperature in the liquid crystal material.

When a pulse voltage of 180 V and 10 msec was applied to the liquid crystal element, the element exhibited a transparent appearance and a transmittance of 43.1%. This state was maintained thereafter. When a pulse voltage of 90 V and 10 msec was applied to the liquid crystal element in this state, the element exhibited a transmittance of 2.0% and a white opaque appearance. Thus, a contrast between the transmission state and the scattering state went to 21.6.

As described in the embodiments 8 to 11, it is understood that sufficient contrast can be obtained by mixing a smectic liquid crystal with a nematic liquid crystal at a predetermined amount, even when the helical pitch length and the distance between two plates are long.

Now, comparative examples 1 to 5 will be described below in comparison with the embodiments 1 to 11.

The conditions of the comparative examples 1 to 5 are shown in Table 6. Table 6 shows the same items as those in the table 1 showing the conditions of the embodiments, except for that item "Rubbing" does not exist. The detailed compositions of respective materials are the same as those shown in the table 2.

TABLE 6

| CE | LC/Mtr | RS/Mtr | Ratio 1 | Ratio 2 | Tm/H | Tm/L |
|---|---|---|---|---|---|---|
| 1 | E31LV CM33 C15 | DAROCUR R526 | N/A | 8:2 | 12.8% | 12.8% |
| 2 | E31LV CM33 C15 | DAROCUR MPL204 | 1:13 (1:13) | 7:3 | 80% | 80% |
| 3 | S-1184 CB15 | DAROCUR R712 | N/A | 8:2 | 84% | 84% |
| 4 | MN1000XX S-811 | DAROCUR AMP10G | 1:4 (1:4) | 6:4 | 87% | 87% |
| 5 | MN1000XX S-811 | DAROCUR R128H | 1:5 (1:5) | 9:1 | 4.9% | 1.8% |

CE: comparative example
LC/Mtr: liquid crystal material
RS/Mtr: resin material
Tm/H: transmittance at high voltage
Tm/L: transmittance at low voltage
N/A: no aromatic ring in liquid crystal Comparative Example 1

The same conditions (including the conditions for producing the liquid crystal element) as those in the embodiment 1 were employed except for that a bifunctional acrylate R712 (Nippon Kayaku Co.) containing aromatic rings was replaced with a bifunctional acrylate R526 (Nippon Kayaku Co.) not containing an aromatic ring in the photo-polymerizable resin material.

When a pulse voltage of 20 V–100 V and 10 msec was applied to the liquid crystal element, the element invariably exhibited a transmittance of 12.8%. Thus, it can be understood that bistability is not exhibited, if the liquid crystal and chiral ingredient contain aromatic rings but the resin does not contain an aromatic ring.

Comparative Example 2

The same conditions as those in the comparative example 1 were employed except for that the bifunctional acrylate R526 (Nippon Kayaku Co.) containing no aromatic ring was replaced with a monofunctional acrylate MPL204 (Nippon Kayaku Co.) containing aromatic rings. The liquid crystal material and the photo-polymerizable resin material were mixed at a ratio of 7:3. In the monofunctional acrylate MPL204, the ratio between the number of aromatic rings and that of carbon atoms in the main chain of monomer was 1:13. The other conditions were the same as those in the comparative example 1.

When a pulse voltage of 20 V–100 V and 10 msec was applied to the liquid crystal element, the element invariably exhibited a transmittance of 80%. As described above, when all of the liquid crystal, chiral dopant, and resin have aromatic rings, bistability is not exhibited if such a resin was used that the ratio between the number of aromatic rings and that of carbon atoms in the main chain of monomer is 1:13.

Comparative Example 3

The same conditions (including the conditions for producing the liquid crystal element) as those in the embodiment 5 were employed except for that the nematic liquid crystal MN1000XX (Chisso Co.) containing aromatic rings was replaced with a nematic liquid crystal S-1184 (Merck Co.) containing no aromatic ring in the liquid crystal material.

When a pulse voltage of 20 V–100 V and 10 msec was applied to the liquid crystal element, the element invariably exhibited a transmittance of 84%. Thus, it can be seen that bistability is not exhibited if the liquid crystal contains no aromatic ring.

Comparative Example 4

The same conditions as those in the embodiment 4 were employed except for that the bifunctional acrylate R712 (Nippon Kayaku Co.) containing aromatic rings was replaced with a monofunctional acrylate AMPLOG (Shin-nakamura Kagaku Co.) containing aromatic rings in the photo-polymerizable resin material, and the liquid crystal material and the photo-polymerizable resin material were mixed at a ratio of 6:4. In the monofunctional acrylate AMP10G, the ratio between the number of aromatic rings and that of carbon atoms in the main chain of monomer was set to 1:4. The other conditions were the same as those in the embodiment 4.

When a pulse voltage of 20 V–100 V and 10 msec was applied to the liquid crystal element, the element invariably exhibited a transmittance of 87%. Thus, it is apparent that, even if all of the liquid crystal, chiral dopant, and resin have aromatic rings, bistability was not exhibited in the case where the ratio between the number of aromatic rings and that of carbon atoms was 1:4.

Comparative Example 5

The same conditions (including the conditions for producing the liquid crystal element) as those in the embodiments 8–11 were employed except for that the liquid crystal exhibiting a smectic phase was not contained.

When a pulse voltage of 170 V and 10 msec was applied to the liquid crystal element, the element exhibited a transparent appearance and a transmittance of 4.9%. This state was maintained thereafter. When a pulse voltage of 70 V and 10 msec was applied to the liquid crystal element, the element exhibited a transmittance of 1.8% and an opaque appearance. Thus, the contrast between the transparent state and scattering state was 2.7. Thus, it can be understood that sufficient contrast was not obtained in the structure having a long helical pitch length and a long distance between two plates, if no smectic liquid crystal was mixed.

Then, embodiments 12 to 15, in which the liquid crystal material is formed of a mixture of tolane liquid crystal, biphenyl liquid crystal and chiral ingredient, will be described below as examples, in which high contrast is obtained even when the selective reflection wavelength is set in the infrared range.

In the following embodiments 12 to 15 and a corresponding comparative example 6, liquid crystal elements of a reflection type were prepared. Transmittances thereof were determined by measuring spectral reflectances (Y values) with a spectrocolorimeter CM-1000 (manufactured by Minolta Co.; Reflection Type) having a white light source. The lower Y value denotes the more transparent state. Contrast is calculated by the following formula:

Contrast=(Y value in the scattering state)/(Y value in the transmission state).

Embodiment 12

A tolane liquid crystal MN1000XX (Chisso Co.) mixed with an alkyl-cyanobiphenyl liquid crystal K21 (Merck Co.) at 40 wt. % was mixed with a chiral dopant S-811 (Merck Co.) at, e.g., 19 wt. % to attain a predetermined helical pitch length of, e.g., 1.1 $\mu$m. The mixture was mixed at a ratio of 9:1 with a monofunctional acrylate R128H (Nippon Kayaku Co.) containing a photo-polymerization initiator DAROCUR 1173 (Ciba-Geigy Co.) at 10 wt. % as a photo-curing resin material for holding the mixture.

The mixture thus formed was sandwiched between a transparent plate having an electrode layer and an opaque plate having an electrode layer to have a thickness of about 20 $\mu$m. Ultraviolet rays were irradiated at 15 mw/cm$^2$ for 10 minutes to cause phase separation and thus form a white opaque liquid crystal element.

When a pulse voltage of 130 V and 10 msec was applied to the liquid crystal element, the element exhibited a transparent appearance and a transmittance of 54.7%. This state was maintained thereafter. When a pulse voltage of 70 V and 10 msec was applied to the liquid crystal element in this state, the element exhibited a transmittance of 1.3% and a white opaque appearance. This scattering state was maintained thereafter.

From the above results, the following can be understood. By adding an alkyl-cyanobiphenyl liquid crystal at 40 wt. % to a tolane liquid crystal, the transmittance in the transmission state was improved by 49.8%, as compared with a liquid crystal element containing no biphenyl liquid crystal material in the comparative example 6, which will be described later. Contrast was also significantly improved from 2.7 to 42.1.

Embodiment 13

A tolane liquid crystal MN1000XX (Chisso Co.) mixed with an alkyl-cyanobiphenyl liquid crystal S2 (Merck Co.) at 30 wt. % was mixed with a chiral dopant S-811 (Merck Co.) at, e.g., 19.8 wt. % to attain a predetermined helical pitch length of, e.g., 1.1 $\mu$m. The mixture was mixed at a ratio of 9:1 with a monofunctional acrylate R128H (Nippon Kayaku Co.) containing a photo-polymerization initiator DAROCUR 1173 (Ciba-Geigy Co.) at 10 wt. % as a photo-curing resin material for holding the mixture.

The mixture thus formed was sandwiched between a transparent plate having an electrode layer and an opaque plate having an electrode layer to have a thickness of about 20 $\mu$m. Ultraviolet rays were irradiated at 15 mw/cm$^2$ for 10 minutes to cause phase separation and thus form a white opaque liquid crystal element.

When a pulse voltage of 140 V and 10 msec was applied to the liquid crystal element, the element exhibited a transparent appearance and a transmittance of 52.1%. This state was maintained thereafter. When a pulse voltage of 70 V and 10 msec was applied to the liquid crystal element in this state, the element exhibited a transmittance of 2.1% and a white opaque appearance. This scattering state was maintained thereafter.

From the above results, the following can be understood. By adding an alkyl-cyanobiphenyl liquid crystal at 30 wt. % to a tolane liquid crystal, the transmittance in the transmission state was improved by 47.2%, as compared with a liquid crystal element in the comparative example 6, which will be described later. Contrast was also significantly improved from 2.7 to 24.8.

Embodiment 14

A tolane liquid crystal MN1000XX (Chisso Co.) mixed with a cyanobiphebyl liquid crystal E31LV (Merck Co.) at 15 wt. % was mixed with a chiral dopant S-811 (Merck Co.) at, e.g., 19.8 wt. % to attain a predetermined helical pitch length of, e.g., 1.1 $\mu$m. The mixture was mixed at a ratio of 9:1 with a monofunctional acrylate R128H (Nippon Kayaku Co.) containing a photo-polymerization initiator DAROCUR 1173 (Ciba-Geigy Co.) at 10 wt. % as a photo-curing resin material for holding the mixture.

The mixture thus formed was sandwiched between a transparent plate having an electrode layer and an opaque plate having an electrode layer to have a thickness of about 20 $\mu$m. Ultraviolet rays were irradiated at 15 mw/cm$^2$ for 10 minutes to cause phase separation and thus form a white opaque liquid crystal element.

When a pulse voltage of 180 V and 10 msec was applied to the liquid crystal element, the element exhibited a transparent appearance and a transmittance of 41.0%. This state was maintained thereafter. When a pulse voltage of 70 V and 10 msec was applied to the liquid crystal element in this state, the element exhibited a transmittance of 1.3% and a white opaque appearance. This scattering state was maintained thereafter.

From the above results, the following can be understood. By adding a cyanobiphenyl liquid crystal at 15 wt. % to a tolane liquid crystal, the transmittance in the transmission state was improved by 36.1%, as compared with a liquid crystal element in the comparative example 6, which will be described later. Contrast was also significantly improved from 2.7 to 27.8.

Embodiment 15

A tolane liquid crystal MN1000XX (Chisso Co.) mixed with a cyanobiphenyl liquid crystal E44 (Merck Co.) at 20wt. % was mixed with a chiral dopant S-811 (Merck Co.) at, e.g., 18 wt. % to attain a predetermined helical pitch length of, e.g., 1.1 $\mu$m. The mixture was mixed at a ratio of 9:1 with a monofunctional acrylate R128H (Nippon Kayaku Co.) containing a photo-polymerization initiator DAROCUR 1173 (Ciba-Geigy Co.) at 10 wt. % as a photo-curing resin material for holding the mixture.

The mixture thus formed was sandwiched between a transparent plate having an electrode layer and an opaque plate having an electrode layer to have a thickness of about 20 $\mu$m. Ultraviolet rays were irradiated at 15 mw/cm$^2$ for 10 minutes to cause phase separation and thus form a white opaque liquid crystal element.

When a pulse voltage of 130 V and 10 msec was applied to the liquid crystal element, the element exhibited a transparent appearance and a transmittance of 46.6%. This state was maintained thereafter. When a pulse voltage of 80 V and 10 msec was applied to the liquid crystal element in this state, the element exhibited a transmittance of 2.8% and a white opaque appearance. This scattering state was maintained thereafter.

From the above results, the following can be understood. By adding a cyanobiphenyl liquid crystal at 20 wt. % to a tolane liquid crystal, the transmittance in the transmission state was improved by 41.7%, as compared with a liquid crystal element in the comparative example 6, which will be described later. Contrast was also significantly improved from 2.7 to 14.9.

Figure 7:
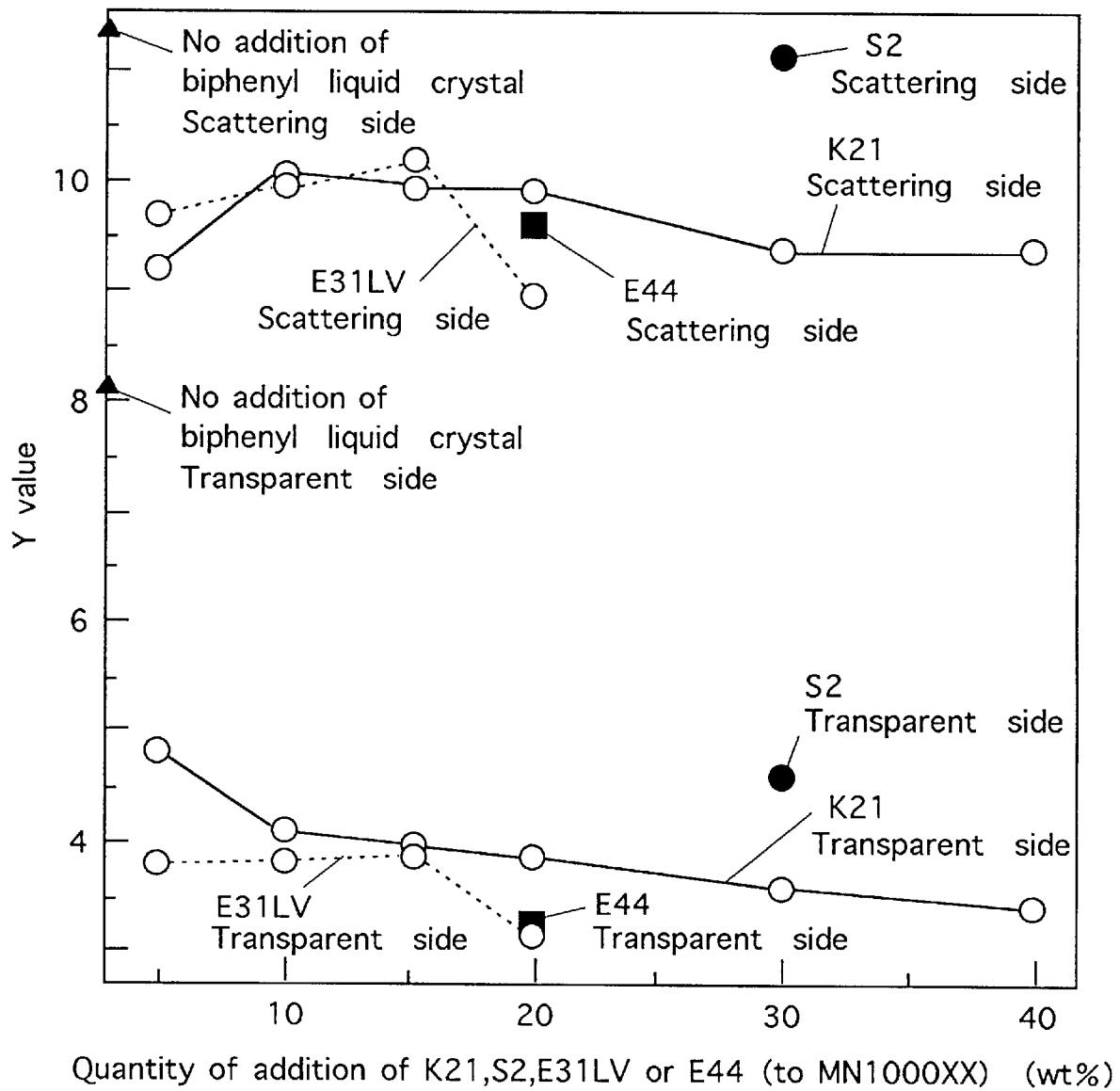
FIG. 7 shows a relationship between the quantity of added biphenyl liquid crystal and the Y value in liquid crystal elements of embodiments 12 to 15 and a comparative example 6.

FIG. 7 shows the relationship between the quantities of added biphenyl liquid crystal and the Y value in the embodiments 12 to 15 and comparative example 6 which will be described later. In connection with the liquid crystal K21 and E31LV, the quantities of addition of K21 and K31LV were varied in the embodiments 12 and 14, and the corresponding changes in Y value are shown. From this, it can be seen that, by adding an appropriate amount of biphenyl liquid crystal to a tolane liquid crystal, the transmittance in the transmission state is significantly improved regardless of the type of biphenyl liquid crystal.

The comparative example 6 corrseponding to the embodiments 1–12 will now be described below.

Comparative Example 6

A tolane liquid crystal MN1000XX (Chisso CO.) was mixed with a chiral dopant S-811 (Merck Co.), e.g., at 17.4 wt. % to attain a predetermined helical pitch length of, e.g., 1.1 μm. The mixture was mixed at a ratio of 9:1 with a monofunctional acrylate R128H (Nippon Kayaku Co.) containing a photo-polymerization initiator DAROCUR 1173 (Ciba-Geigy Co.) at 10 wt. % as a photo-curing resin material for holding the mixture.

The mixture thus formed was sandwiched between a transparent plate having an electrode layer and an opaque plate having an electrode layer to have a thickness of about 20 μm. Ultraviolet rays were irradiated at 15 mw/cm$^2$ for 10 minutes to cause phase separation and thus form a white opaque liquid crystal element.

When a pulse voltage of 170 V and 10 msec was applied to the liquid crystal element, the element exhibited a transparent appearance and a transmittance of 4.9%. This state was maintained thereafter. When a pulse voltage of 70 V and 10 msec was applied to the liquid crystal element in this state, the element exhibited a transmittance of 1.8% and a white opaque appearance. This scattering state was maintained thereafter. The element including the tolane liquid crystal alone as liquid crystal material exhibited a contrast of 2.7.

The embodiments 1 to 15 have been described in connection with the liquid crystal elements of PNLC type, in which liquid crystal material and resin material are phase-separated, and the phase-separated resin has a three-dimensional network structure. Similarly, high contrast is also obtained in other types of liquid crystal elements according to the invention such as a PDLC type, microcapsule type, and impregnation type in which a liquid crystal material is impregnated into a substrate having a large number of pores.

As described above, the liquid crystal element having the composite layer according to the invention can provide high-resolution display with a single matrix driving without requiring an expensive memory element such as TFT and MIM arranged on the plate, because the liquid crystal itself has the memory effect. Further, sufficiently high contrast can be obtained by appropriately selecting materials. Since no polarizer is used, it is possible to provide a bright liquid crystal element and therefore a bright liquid crystal display device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal element comprising a pair of plates at least one of which is transparent, and a composite layer retained between said plates, said composite layer including a transparent resin substrate and a liquid crystal material which has a cholesteric characteristic, wherein said liquid crystal material contains aromatic rings, said transparent resin substrate contains aromatic rings, and ratio of the number of aromatic rings to that of carbon atoms in the main chain of monomer of the transparent resin substrate is in a range from 1:5 to 1:12, the number of said carbon atoms being the number of carbon atoms of groups in the main chain of the monomer represented by —CH$_2$—, —CH— or the like except for aromatic rings, —CO— groups, and —COOH— groups.

2. A liquid crystal element according to claim 1, wherein said liquid crystal material is formed of nematic liquid crystal material and chiral ingredient added thereto.

3. A liquid crystal element according to claim 2, wherein both of said nematic liquid crystal material and said chiral ingredient contain aromatic rings.

4. A liquid crystal element according to claim 3, wherein a molecule of said chiral ingredient contains a cyano group.

5. A liquid crystal element according to claim 3, wherein a molecule of said chiral ingredient contains a —COO— group.

6. A liquid crystal element according to claim 2, wherein a molecule of said nematic liquid crystal contains a fluorine atom.

7. A liquid crystal element according to claim 1, wherein said transparent resin is photo-curing resin.

8. A liquid crystal element according to claim 7, wherein said photo-curing resin is monofunctional or bifunctional acrylate which has a molecular structure containing one or two aromatic rings in the main chain of monomer.

9. A liquid crystal element according to claim 7, wherein said composite layer is prepared by phase separation caused by irradiating light beams to a mixture of said photo-curing resin material and said liquid crystal material to form the photo-curing resin substrate containing the liquid crystal material.

10. A liquid crystal element according to claim 1, wherein said transparent resin substrate has a three-dimensionally continuous mesh structure.

11. A liquid crystal element according to claim 1, wherein the weight ratio of said liquid crystal material to said transparent resin substrate is in a range from 5:5 to 9:1.

12. A liquid crystal element comprising a pair of plates at least one of which is transparent, and a composite layer retained between said plates, said composite layer including a transparent matrix material and a liquid crystal material which has a cholesteric characteristic, wherein said liquid crystal material is formed of mixture of (a) a first compound of a liquid crystal material having a nematic characteristic, (b) a second compound of a liquid crystal material having a smectic characteristic, and (c) a third compound having a chiral ingredient.

13. A liquid crystal element according to claim 12, wherein said transparent matrix is made of resin.

14. A liquid crystal element comprising a pair of plates at least one of which is transparent, and a composite layer retained between said plates, said composite layer including a transparent matrix material and a liquid crystal material which has a cholesteric characteristic wherein said liquid crystal material is formed of mixture of a liquid crystal material having a nematic characteristic, a liquid crystal having a smectic characteristic, and a chiral ingredient wherein said transparent matrix material is made of photo-curing resin.

15. A liquid crystal element according to claim 14, wherein said composite layer is prepared by phase separation caused by irradiating light beams to a mixture of said photo-curing resin material and said liquid crystal material to form the photo-curing resin matrix containing the liquid crystal material.

16. A liquid crystal element comprising a pair of plates at least one of which is transparent, and a composite layer retained between said plates, said composite layer including a transparent matrix material and a liquid crystal material which has a cholesteric characteristic, wherein said liquid crystal material is formed of mixture of a liquid crystal material having a nematic characteristic, a liquid crystal having a smectic characteristic, and a chiral ingredient wherein said transparent matrix material has a three-dimensionally continuous mesh structure.

17. A liquid crystal element comprising a pair of plates at least one of which is transparent, and a composite layer retained between said plates and including a transparent matrix material and a liquid crystal material which has a cholesteric characteristic, wherein said liquid crystal material is formed of a mixture of a first compound having a tolane portion, a second compound containing a biphenyl component and a chiral ingredient.

18. A liquid crystal element according to claim 17, wherein said transparent substrate is made of resin.

19. A liquid crystal element according to claim 17, wherein said transparent substrate is made of photo-curing resin.

20. A liquid crystal element according to claim 19, wherein said composite layer is prepared by phase separation caused by irradiating light beams to a mixture of said photo-curing resin material and said liquid crystal material to form the photo-curing resin substrate containing the liquid crystal material.

21. A liquid crystal element according to claim 17, wherein said transparent substrate has a three-dimensionally continuous mesh structure.

22. A liquid crystal material having a cholesteric characteristic, said liquid crystal material being formed from a mixture of (a) a first compound of a liquid crystal material having a nematic characteristic, (b) a second compound of a liquid crystal material having a smectic characteristic, and (c) a third compound having a chiral ingredient.

23. A liquid crystal material having a cholesteric characteristic, said liquid crystal material being formed of a mixture of a first compound having a tolane portion, a second compound containing a biphenyl component and a chiral ingredient, wherein the amount of said second compound is about 30 wt % or less of the amount of said first compound.

24. A liquid crystal material having a cholesteric characteristic, said liquid crystal material being formed from a mixture of (a) a first compound of a liquid crystal material having a nematic characteristic said nematic material containing fluorine atoms, (b) a second compound of a liquid crystal material having a smectic characteristic, and (c) a third compound having a chiral ingredient.

25. A liquid crystal element according to claim 12 wherein said transparent matrix material is made of photo-curing resin.

26. A liquid crystal element according to claim 25 wherein said composite layer is prepared by phase separation caused by radiating light beams to a mixture of said photo-curing resin material and said liquid crystal material to form the photo-curing resin substrate containing the liquid crystal material.

27. A liquid crystal element according to claim 12 wherein said transparent matrix material has a three-dimensionally continuous mesh structure.

* * * * *

UNITED STATES PATENT AND TRADEMARK OFFICE
CERTIFICATE OF CORRECTION

PATENT NO : 6,015,507

DATED : January 18, 2000

INVENTOR(S): Nobuyuki KOBAYASHI, Kiyofumi HASHIMOTO, and Takuji HATANO

It is certified that error appears in the above-identified patent and that said Letters Patent is hereby corrected as shown below:

Column 8, line 20, after "itself", insert --,-- .

Column 21, line 3 (claim 14, line 5), after "characteristic", insert --,-- .

Column 21, line 30 (claim 17, line 6), before "a first compound", insert --(a)-- .

Column 21, line 31 (claim 17, line 7), before "a second compound", insert --(b)-- .

Column 21, line 32 (claim 17, line 8), before "a chiral", insert --(c) a third component being--.

Column 22, line 15 (claim 23, line 3), before "a first compound", insert --(a)--.

Column 22, line 15 (claim 23, line 3), before "a second compound", insert --(b)--.

UNITED STATES PATENT AND TRADEMARK OFFICE
CERTIFICATE OF CORRECTION

PATENT NO : 6,015,507

DATED : January 18, 2000

INVENTOR(S): Nobuyuki KOBAYASHI, Kiyofumi HASHIMOTO, and Takuji HATANO

It is certified that error appears in the above-identified patent and that said Letters Patent is hereby corrected as shown below:

Column 22, line 16 (claim 23, line 4), delete "component" and insert --liquid crystal material--.

Column 22, line 16 (claim 23, line 4), before "a chiral ingredient,", insert --(c) a third component being--.

Signed and Sealed this

Eighth Day of May, 2001

Attest:

NICHOLAS P. GODICI

Attesting Officer

Acting Director of the United States Patent and Trademark Office